United States Patent
Yang et al.

(10) Patent No.: US 12,472,280 B2
(45) Date of Patent: Nov. 18, 2025

(54) MANUFACTURE OF PHOTO-CROSSLINKABLE BIODEGRADABLE TISSUE ADHESIVE USING COPOLYMER

(71) Applicant: SNVIA CO., LTD., Busan (KR)

(72) Inventors: Seung Yun Yang, Miryang-si (KR); Samdae Park, Busan (KR); Hyeseon Lee, Miryang-si (KR)

(73) Assignee: SNVIA CO., LTD., Busan (KR)

( * ) Notice: Subject to any disclaimer, the term of this patent is extended or adjusted under 35 U.S.C. 154(b) by 626 days.

(21) Appl. No.: 17/772,530

(22) PCT Filed: Oct. 31, 2020

(86) PCT No.: PCT/KR2020/014941
§ 371 (c)(1),
(2) Date: Apr. 28, 2022

(87) PCT Pub. No.: WO2021/086072
PCT Pub. Date: May 6, 2021

(65) Prior Publication Data
US 2022/0387664 A1    Dec. 8, 2022

(30) Foreign Application Priority Data

Oct. 31, 2019 (KR) .......................... 10-2019-0137872
Jan. 30, 2020 (KR) .......................... 10-2020-0011257

(51) Int. Cl.
*A61L 24/08* (2006.01)
*A61L 24/00* (2006.01)
*C08B 37/08* (2006.01)

(52) U.S. Cl.
CPC ........... *A61L 24/08* (2013.01); *A61L 24/0031* (2013.01); *A61L 24/0042* (2013.01); *C08B 37/0072* (2013.01)

(58) Field of Classification Search
CPC .. A61L 24/08; A61L 24/0031; A61L 24/0042; C08B 37/0072
See application file for complete search history.

(56) References Cited

U.S. PATENT DOCUMENTS 8,846,836 B2 *   9/2014   Glauser ..................... A61P 9/00
                                                        526/126
2013/0231474 A1   9/2013   Auzely et al.
2022/0118124 A1 * 4/2022   Yang ........................ A61K 47/58
2023/0416472 A1 * 12/2023  Park ......................... A61L 15/28
2024/0050622 A1 * 2/2024   Yang ........................ C08B 37/003

FOREIGN PATENT DOCUMENTS

| CN | 103724455 A   |   | 4/2014 |
| CN | 103724455 B   | * | 7/2016 |
| KR | 10-1763368 B1 |   | 8/2017 |
| WO | 2014-072330 A1|   | 5/2014 |

OTHER PUBLICATIONS

Office Action of Japanese Patent Application No. 2022-525137 mailed Mar. 10, 2023.
Chemical Society of Japan, Kagaku Binran Applied Chemistry, 7th edition, 2014, pp. 1581.
European Search Report of EP 20882584 mailed Oct. 10, 2023.
Emi A. Kiyotake et al., "Development and quantitative characterization of the precursor rheology of hyaluronic acid hydrogels for bioprinting", Acta Biomaterialia, vol. 95, Sep. 1, 2019, pp. 176-187.
International Search Report for PCT/KR2020/014941 mailed Feb. 15, 2021 from Korean Intellectual Property Office.
Ajeesh Chandrasekharan et al., "In situ Photocrosslinkable Hyaluronic Acid-Based Surgical Glue with Tunable Mechanical Properties and High Adhesive Strength", Journal of Polymer Science, Part A: Polymer Chemistry, 2019, vol. 57, No. 4, pp. 522-530.
Sani, E. S. et al., "Engineering Adhesive and Antimicrobial Hyaluronic Acid/Elastin-like Polypeptide Hybrid Hydrogels for Tissue Engineering Applications", ACS Biomaterials science & engineering, 2018, vol. 7, No. 7, pp. 2528-2540.
Van Nieuwenhove, I. et al., "Photo-crosslinkable biopolymers targeting stem cell adhesion and proliferation: the case study of gelatin and starch-based IPNs", Journal of materials science: Materials in medicine, 2015, vol. 26, No. 2. article No. 104, inner pp. 1-8.

* cited by examiner

*Primary Examiner* — Scarlett Y Goon
*Assistant Examiner* — David H Cho
(74) *Attorney, Agent, or Firm* — Revolution IP, PLLC

(57) ABSTRACT

The present invention relates to the manufacture of a photo-crosslinkable biodegradable tissue adhesive using a multi-network-forming copolymer, and provides a hyaluronic acid copolymer compound having excellent elongation, mechanical properties, and tissue adhesion. The compound fundamentally does not undergo phase separation, and enables the manufacture of a tissue adhesive with desired adhesive characteristics and physical characteristics.

6 Claims, 6 Drawing Sheets

MANUFACTURE OF PHOTO-CROSSLINKABLE BIODEGRADABLE TISSUE ADHESIVE USING COPOLYMER

CROSS REFERENCE TO PRIOR APPLICATIONS

This application is a National Stage Application of PCT International Patent Application No. PCT/KR2020/014941 filed on Oct. 31, 2020, under 35 U.S.C. § 371, which claims priority to Korean Patent Application Nos. 10-2019-0137872 filed on Oct. 31, 2019 and 10-2020-0011257 filed on Jan. 30, 2020, respectively, which are all hereby incorporated by reference in their entirety.

TECHNICAL FIELD

The present disclosure relates to manufacture of a photo-crosslinkable biodegradable tissue adhesive using a copolymer.

BACKGROUND ART

Medical tissue adhesives are used for wound healing by hemostasis or bonding of the wound, or by protecting a treatment site.

Conventional cyanoacrylate-based tissue adhesives show fast adhesive performance, but have poor adhesion and flexibility on wet surfaces, and toxic by-products such as formaldehyde are generated in the decomposition process, resulting in low biocompatibility. Further, since a formed adhesive layer is opaque and uneven, there has been a limitation in that it is difficult to apply to a surface requiring high light transmittance, such as the surface of eyeballs.

In addition, although fibrin-based tissue adhesives using the blood coagulation process in the body have high biocompatibility, it has a disadvantage in that it has low adhesion to mucous membranes and wet tissues.

Recently, a photo-crosslinkable tissue adhesive, capable of maintaining high adhesion with tissues by forming a hydrogel on the spot by light such as UV, is attracting attention. In general, it is possible to achieve high adhesion to a desired tissue by introducing a photo-crosslinking group to a water-soluble polymer to prepare a photo-crosslinkable polymer, and irradiating light to a solution dissolved with the same to form a hydrogel.

In particular, hyaluronic acid (HA), which is a component of various tissues in the human body, may help wound healing, and thus introduction of the photo-crosslinking group may facilitate wound closure as well as tissue regeneration.

However, the conventional photo-crosslinkable HA has a problem in that it is used only in limited fields due to poor flexibility and difficulty in controlling physical properties.

Therefore, there is a need for research on a photo-crosslinkable hyaluronic acid compound using a multinetwork-forming copolymer providing improved mechanical properties (mechanical strength and flexibility).

DISCLOSURE

TECHNICAL GOALS

An object of the present disclosure is to provide a copolymeric hyaluronic acid with different photo-crosslinking lengths forming multilength networks, thereby providing excellent elongation, mechanical properties, and excellent adhesiveness even in skin and mucosal tissues.

In addition, another object of the present disclosure is to provide a biodegradable tissue adhesive using the hyaluronic acid copolymer compound.

TECHNICAL SOLUTIONS

To achieve the above objects, example embodiments of the present disclosure provide a compound represented by Chemical Formula 1.

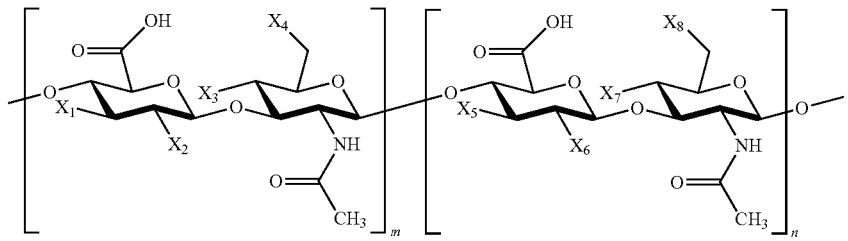

[Chemical Formula 1]

In Chemical Formula 1, m or n is an integer of 1 to 10,000, respectively, $X_1$~$X_8$ may be the same or different and is OH or a substituent of Chemical Formula 1-1, and

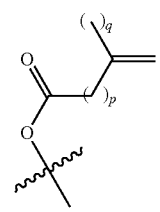

[Chemical Formula 1-1]

in Chemical Formula 1-1, p or q is an integer of 0 to 10, respectively.

Further, example embodiments of the present disclosure provide a hydrogel which includes compounds represented by Chemical Formula 1 to 3 and is formed via a photo-crosslinking reaction.

Furthermore, example embodiments of the present disclosure provide a biodegradable tissue adhesive including the compound represented by Chemical Formula 1 above.

ADVANTAGEOUS EFFECTS

A hyaluronic acid copolymer compound prepared according to example embodiments of the present disclosure does not fundamentally undergo phase separation as a single component (unlike blending system), and has excellent elongation and mechanical properties as well as excellent adhesion to skin and mucosal tissues.

In addition, since the physical properties of the adhesive may be controlled by copolymeric hyaluronic acid compounds with multiple photocrosslinkable groups with crosslinking lengths, the adhesive may be used as a medical adhesive to be used in various parts of the body and is also useful as a medical hemostatic agent, a wound dressing agent, and an anti-adhesion agent.

BRIEF DESCRIPTIONS OF THE DRAWINGS

FIG. 1 is a diagram showing changes in tensile strength according to a mixing ratio of HAMA and HAPA.

FIGS. 2a-d are diagrams showing changes in mechanical properties according to a component ratio in a HAMA-co-HAPA copolymer and shows analysis results of (a) tensile strength, (b) tensile modulus, (c) toughness, and (d) elongation.

MODES FOR CARRYING OUT INVENTION

Figure 1:
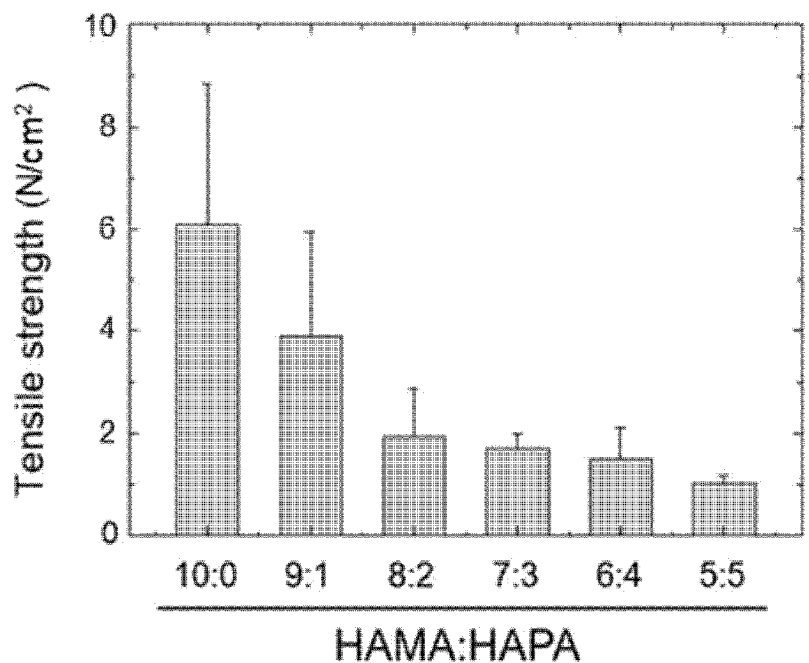

Hereinafter, the present invention will be described in detail.

The present inventors synthesized a hyaluronic acid copolymer compound copolymerized with hyaluronic acid compounds having different photo-crosslinking lengths with excellent properties such as elongation, mechanical strength, and tissue adhesion, enabling manufacture of tissue adhesives having desired adhesiveness and physical properties while not fundamentally undergoing phase separation. Therefore, the inventors completed the present invention by discovering that the hyaluronic acid copolymer compound may be usefully used as a medical adhesive, a medical hemostatic agent, a wound dressing agent, and an anti-adhesion agent that are applicable to various parts of the body.

An example embodiment of the present disclosure provides a compound represented by Chemical Formula 1.

In Chemical Formula 1, m or n is an integer of 1 to 10,000, respectively, $X_1 \sim X_8$ may be the same or different and is OH or a substituent represented by Chemical Formula 1-1, and

[Chemical Formula 1-1]

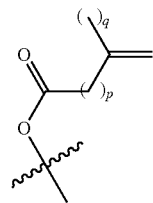

in Chemical Formula 1-1, p or q is an integer of 0 to 10, respectively.

In this case, each of $X_1 \sim X_4$ and $X_5 \sim X_8$ essentially includes at least one substituent represented by Chemical Formula 1-1, the remainder may be a hydroxyl group, and the substitution rate of the substituent of Chemical Formula 1-1 may be 1 to 400%.

In particular, in Chemical Formula 1, m or n is an integer of 1 to 10000 respectively, $X_1 \sim X_8$ include at least one substituent of Chemical Formula 1-1, and $X_5 \sim X_8$ also include at least one substituent of Chemical Formula 1-1 which is different from the substituent of $X_1 \sim X_4$, and p or q is preferably an integer of 0 to 10, respectively.

As described above, the compound of Chemical Formula 1 has an ethylenically unsaturated group in a hyaluronic acid.

In addition, the compound represented by Chemical Formula 1 may be a compound represented by Chemical Formula 2 or Chemical Formula 3 below.

[Chemical Formula 1]

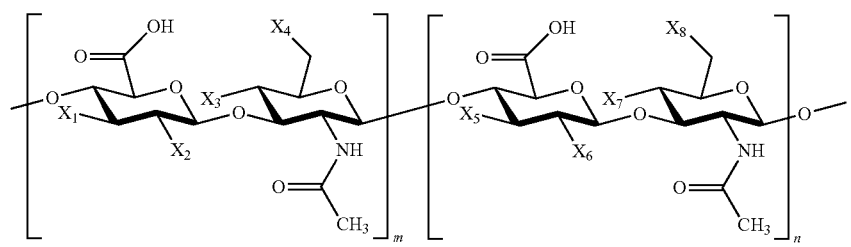

[Chemical Formula 2]

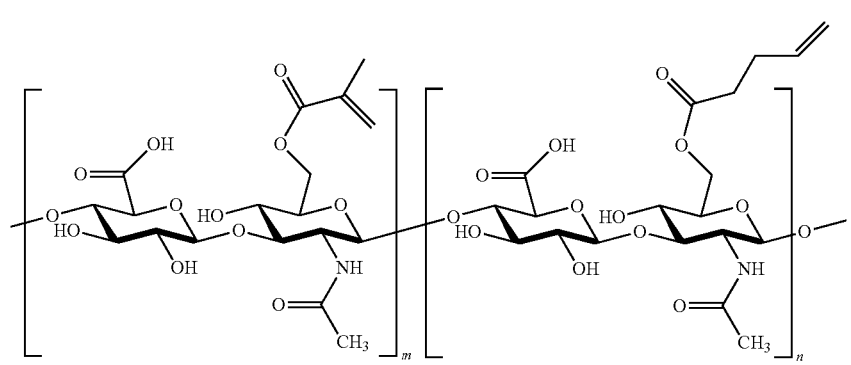

[Chemical Formula 3]

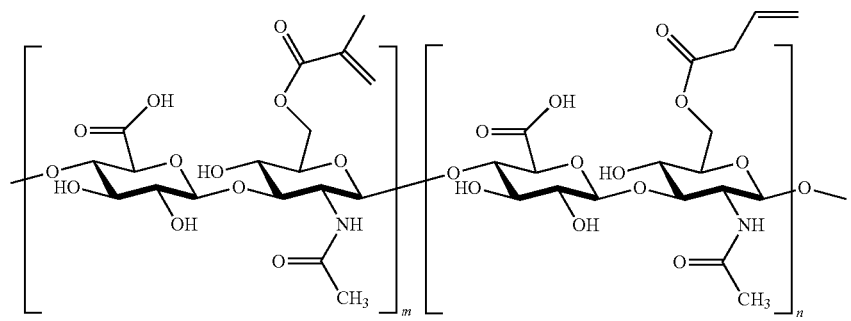

In Chemical Formula 2 or Chemical Formula 3, m or n is an integer of 1 to 10,000, respectively.

In this case, the compound represented by Chemical Formula 1 may be randomly copolymerized with m and n in a ratio of 9:1 to 7:3 and may preferably be formed by random copolymerization in a ratio of 7:3, but is not limited thereto.

The compounds of Chemical Formulas 1 to 3 are hyaluronic acid copolymer compounds obtained by random copolymerization of hyaluronic acid compounds having different photo-crosslinking lengths, and problems such as phase separation and degradation in the commercial value of a product that may occur by simply mixing two or more polymers may be solved.

According to an example embodiment of the present disclosure, it was confirmed that the compound of Chemical Formula 2 manufactured by random copolymerization of HAMA and HAPA shows improved mechanical strength than a simple mixture of HAMA and HAPA and also exhibits excellent elongation and adhesion. In other words, according to the example embodiment of the present disclosure, a multi-network structure is formed inside a copolymer hydrogel, which increases flexibility as well as mechanical strength at the same time, whereas, generally in the case of a mixture, the strength of the mixture is difficult to be higher than that of a single material (HAMA) having high strength, showing only strength of an average value.

In addition, an example embodiment of the present disclosure provides a hydrogel which includes the compounds represented by Chemical Formula 1 to Chemical Formula 3 and is formed via a photo-crosslinking reaction. The hydrogel may be used as a carrier for a physiologically active material or drug delivery, and tissue regeneration and implant material for filling, but is not limited thereto.

In addition, an example embodiment of the present disclosure provides a biodegradable tissue adhesive including any one of the compounds represented by the Chemical Formula 1 to Chemical Formula 3.

In this case, the compound is a photo-crosslinkable biodegradable tissue adhesive capable of maintaining a high adhesion with tissues by forming a hydrogel through a light-induced crosslinking reaction. In this case, the photo-crosslinking reaction, as well as a UV-induced crosslinking reaction, enables the formation of a hydrogel by the photo-crosslinking reaction even under light of other wavelengths including visible light if using a photoinitiator having different absorption wavelength.

In addition, the biodegradable tissue adhesive may be used as any one or more selected from the group consisting of a medical adhesive, a medical hemostatic agent, a wound dressing agent, an anti-adhesion agent, a cell culture support, a 3D printer bioink, and a bio-coating material, but is not limited thereto.

Conventional photo-crosslinkable hyaluronic acid methacrylate (HAMA) has been applied in limited area due to lack of flexibility during photo-crosslinking. In order to improve the same, through adjustment of the mechanical properties of the hydrogel tissue adhesive by mixing hyaluronic acid butylacrylate (HABA) or hyaluronic acid pentacrylate (HAPA) with excellent elongation, the range of use may be broadened for a portion where movement occurs, thereby expecting the increase in the adhesion of tissues.

However, simply mixing two or more polymers may cause phase separation due to internal and external factors, which leads to degradation in the commercial value of a product.

In the present disclosure, in order to solve the issue, two or more photo-crosslinkable functional groups having different lengths were simultaneously introduced to hyaluronic acid to synthesize a new photo-crosslinkable copolymer with excellent mechanical properties while being flexible.

As a single component, the copolymer fundamentally has no risk of undergoing the phase separation. In addition, the newly synthesized photo-crosslinkable copolymer is flexible and has excellent mechanical strength while the physical properties of an adhesive are freely adjustable, thereby enabling development of medical adhesives to be used in various parts of the body.

In addition, the copolymer compound according to the example embodiment of the present disclosure may be applied as a medical hemostatic agent, a wound dressing agent, an anti-adhesion agent, a cell culture support, a 3D printer bioink, and a bio-coating material, but any application is possible if being usable as a bioadhesive without limitation.

Hereinafter, the present disclosure will be described in more detail through examples. These examples are merely for describing the present disclosure in more detail, and it is apparent to a person of an ordinary skill in the art to which the present invention pertains that the scope of the present invention is not limited by the examples according to the gist of the present invention.

<Synthesis Example 1>Synthesis of HAMA-co-HAPA copolymer

<Comparative Example 1>Preparation of mixture of HAMA and HAPA

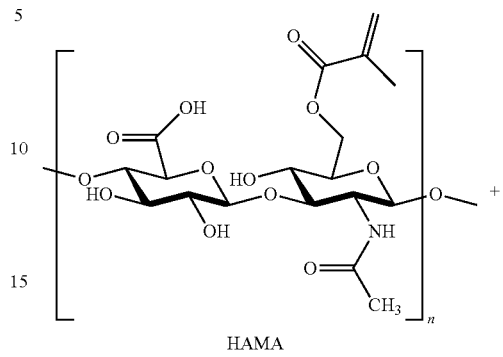

HAMA

[Scheme 1]

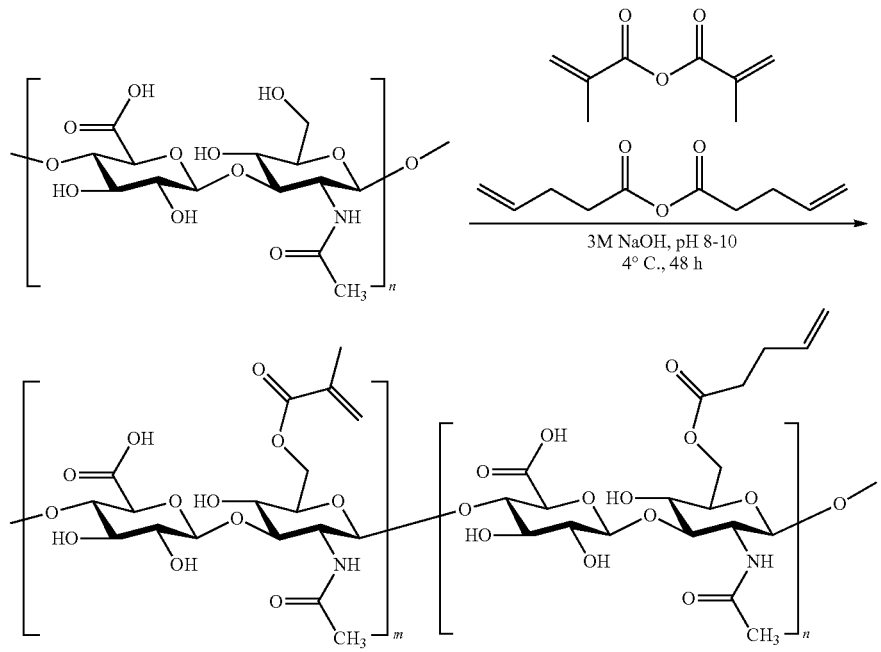

As in Scheme 1, 10 g (26 mmol) of hyaluronic acid was dissolved in 100 ml of purified water and cooled to 0-5° C. 36.4 mmol of methacrylic anhydride, 15.6 mmol of 4-pentenoic anhydride, and 100 ml of 3M NaOH solution were added thereto, followed by stirring for 2 days. The reaction product was purified by precipitation in ethanol and vacuum-dried to prepare a HAMA-HAPA random copolymer (hereinafter referred to as 'HAMA-co-HAPA').

Figure 4:
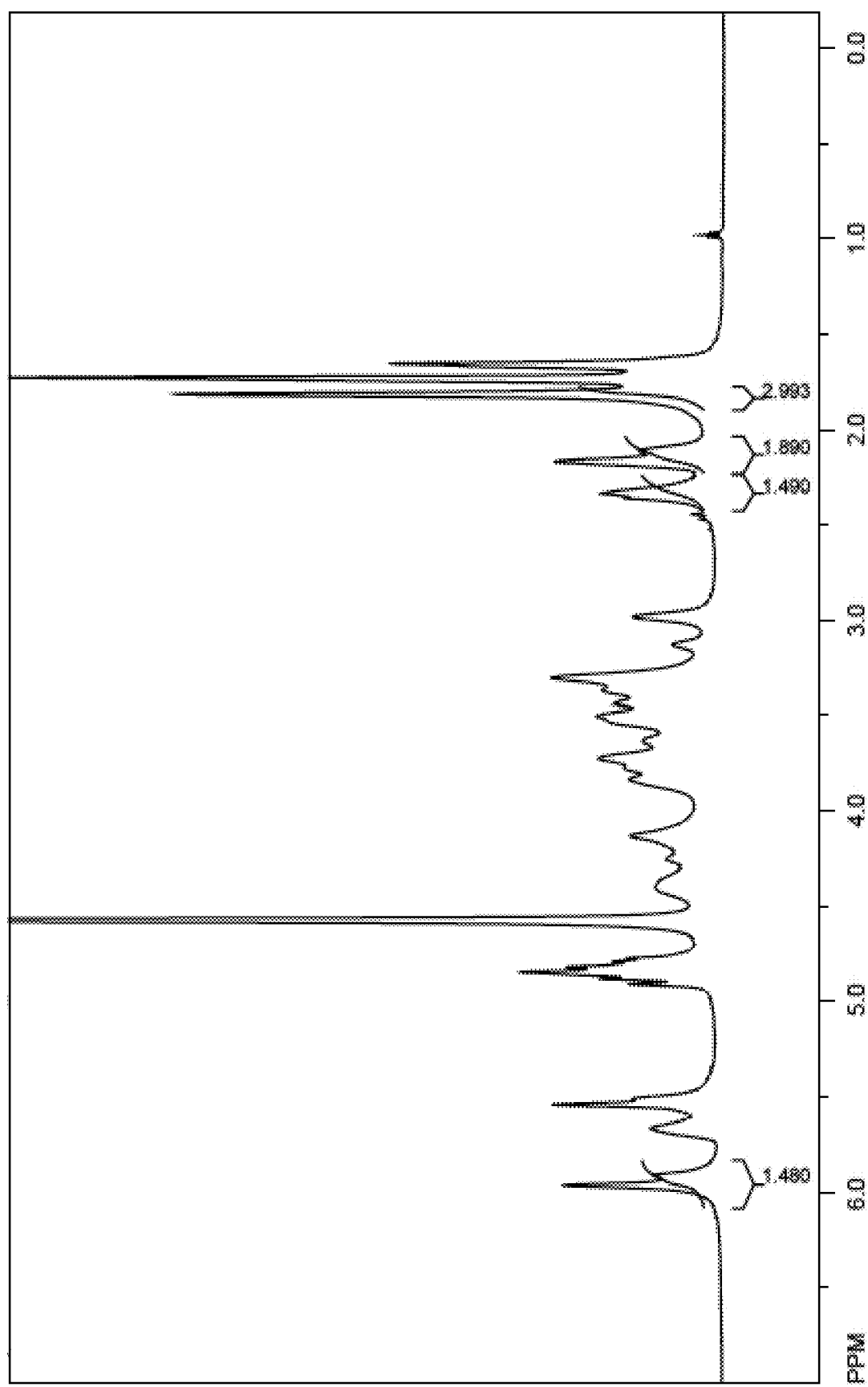
FIG. 4 is an NMR image of a HAMA-co-HAPA copolymer.

Yield: 82%, $^1$H-NMR (300 MHz, D$_2$O):δ (ppm)=6.5, 6.1, 5.6 (CH=CH$_2$), 4.5-4.3 (CH$_2$), 3.8-3.0 (CH), 2.5-2.35 (CH$_2$CH$_2$), 1.8 (CH$_3$), 1.7 (CH$_3$). (See FIG. 4)

In the synthesized HAMA-co-HAPA, the ratio of m and n was 7:3, and HAMA-co-HAPA copolymers whose ratio of methacrylic anhydride and 4-pentenoic anhydride to be added varies from 10:0 to 9:1 were prepared to be used as a sample for Examples below.

-continued

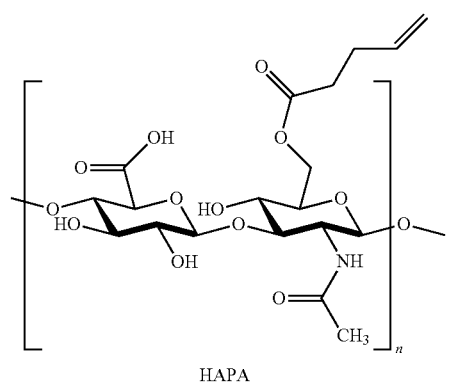

Figure 5:
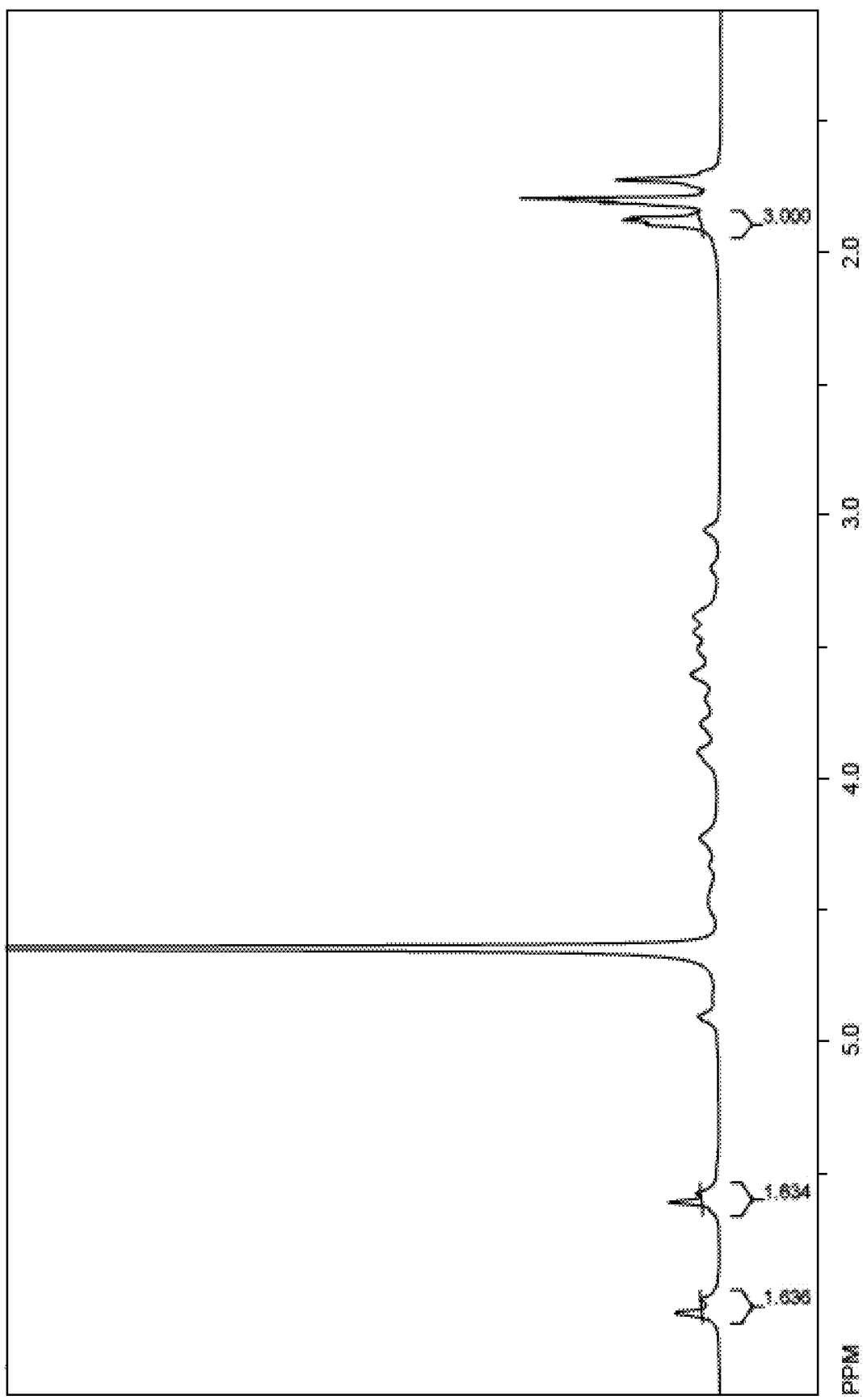
FIGS. 5 and 6 are NMR images of HAMA and HAPA, respectively.

HAPA 10 g (26 mmol) of hyaluronic acid was dissolved in 100 ml of purified water and cooled to 0-5° C. Here, 104 mmol of methacrylic anhydride and 100 ml of 3M NaOH solution were added thereto, followed by stirring for 2 days. The reaction product was purified by to precipitation in ethanol and vacuum-dried to prepare hyaluronic acid methacrylate (HAMA) (see FIG. 5).

Figure 6:
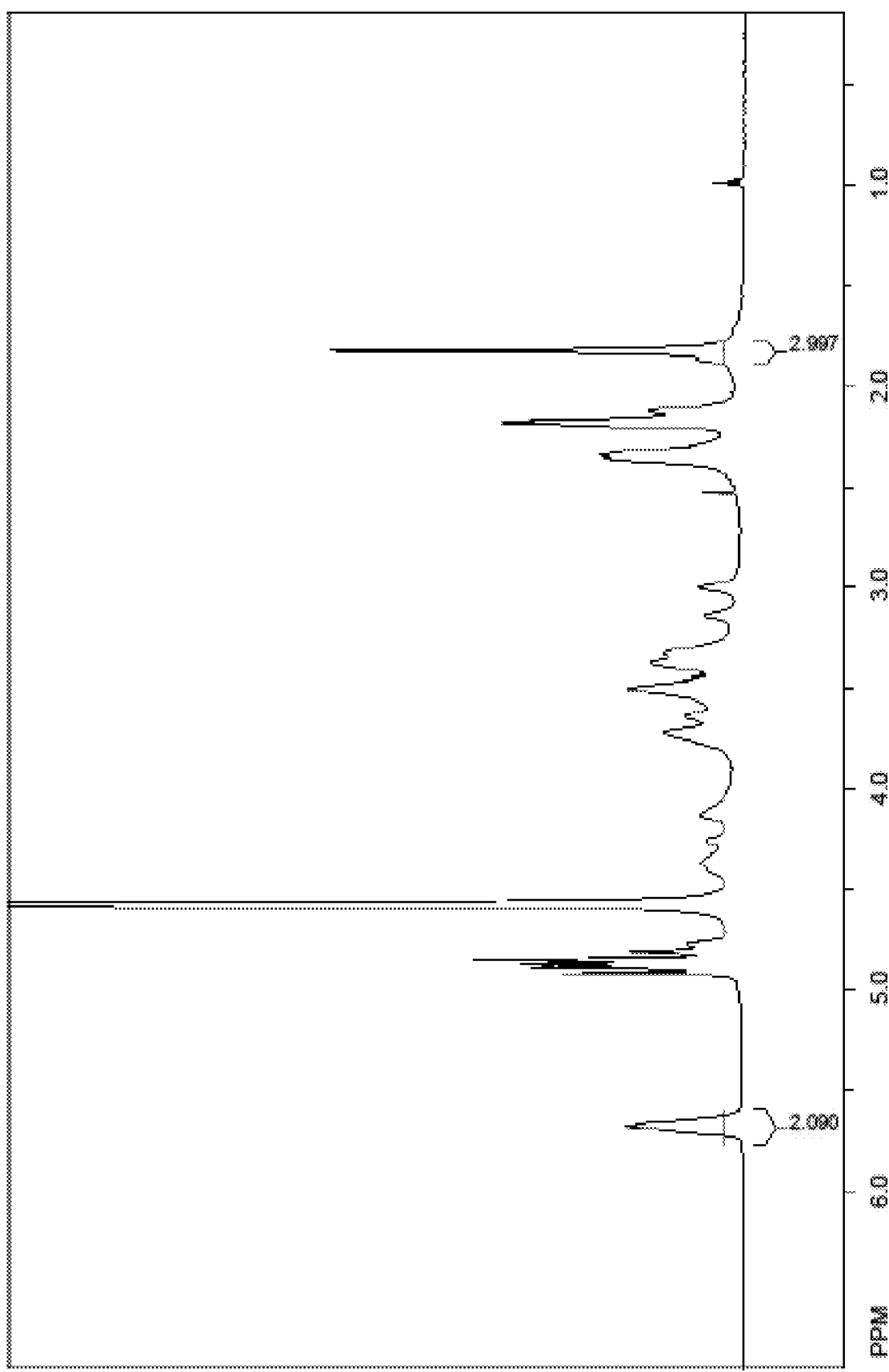

10 g (26 mmol) of hyaluronic acid was dissolved in 100 ml of purified water and cooled to 0-5° C. 156 mmol of 4-pentenoic anhydride and 100 ml of 3M NaOH solution were added thereto, followed by stirring for 2 days. The reaction product was purified by precipitation in ethanol and vacuum-dried to prepare hyaluronic acid pentacrylate (HAPA) (see FIG. 6).

Mixtures of HAMA and HAPA were prepared by simply mixing the prepared HAMA and HAPA in varied mixing ratios of 10:0, 9:1, 8:2, 7:3, 6:4 and 5:5, respectively.

<Example 1> Analysis of mechanical strength and flexibility of HAMA-co-HAPA

Tensile strength, tensile modulus, toughness, and elongation of the copolymer HAMA-co-HAPA were measure by a tensile test, wherein the copolymer HAMA-co-HAPA was synthesized to have HAMA and HAPA in a varied ratio of 10:0, 9:1, and 7:3 by varying the ratio of methacrylic anhydride and 4-pentenoic anhydride added in <Synthesis Example 1>.

For the tensile test, a test piece molded in the dogbone shape according to the ASTM method using AND's Universal testing machine was measured at a speed of 1 mm/min.

For tensile strength, the maximum stress was measured in a strain-stress curve, and for tensile modulus, the slope between stress and strain rate was measured. Toughness was analyzed by integrating the total area up to a fracture point of a specimen, and elongation was analyzed by measuring the strain rate at the fracture point.

As a result, as shown in FIG. 1, it was confirmed that the tensile strength of the formed hydrogel decreased as the ratio of HAPA with a long cross-linking length increased in the mixture formed by simply mixing HAMA and HAPA.

Figure 2A:
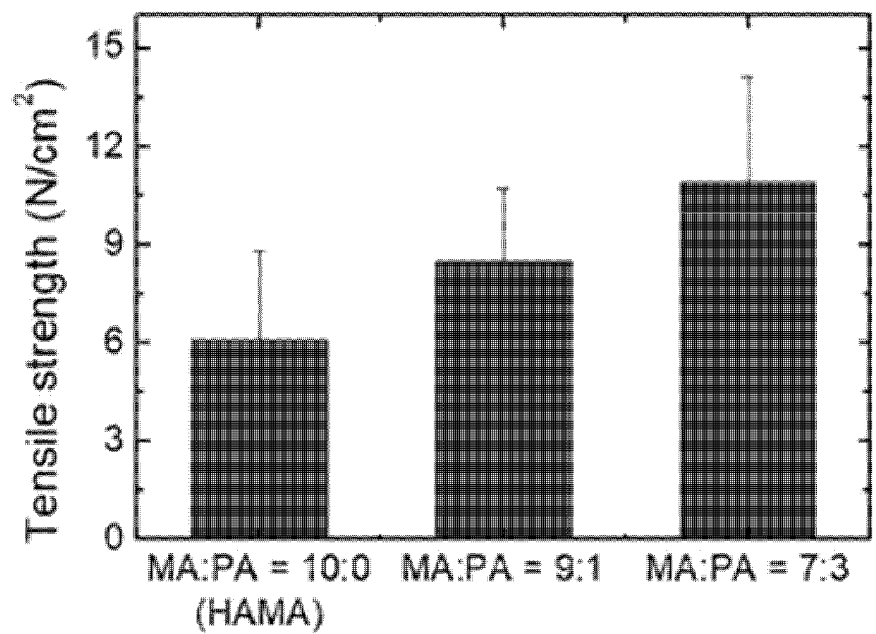
Figure 2B:
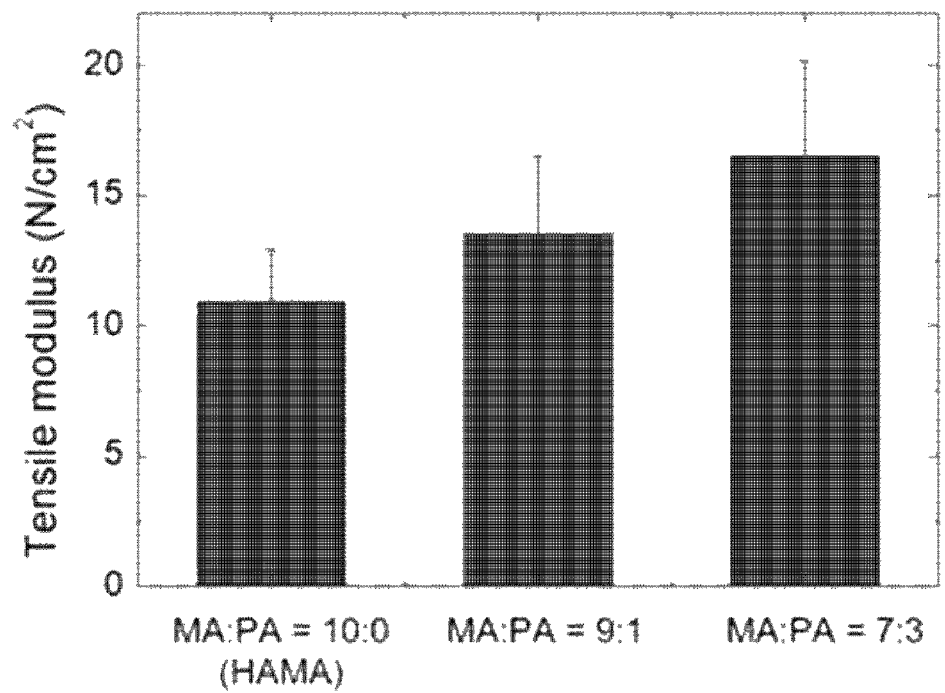

However, in the preparation of the HAMA-co-HAPA copolymer according to <Synthesis Example 1>, the tensile strength and tensile modulus of the formed hydrogel increased as the ratio of HAPA with a long cross-linking length increased in the tensile test (see FIGS. 2a and 2b).

Figure 2C:
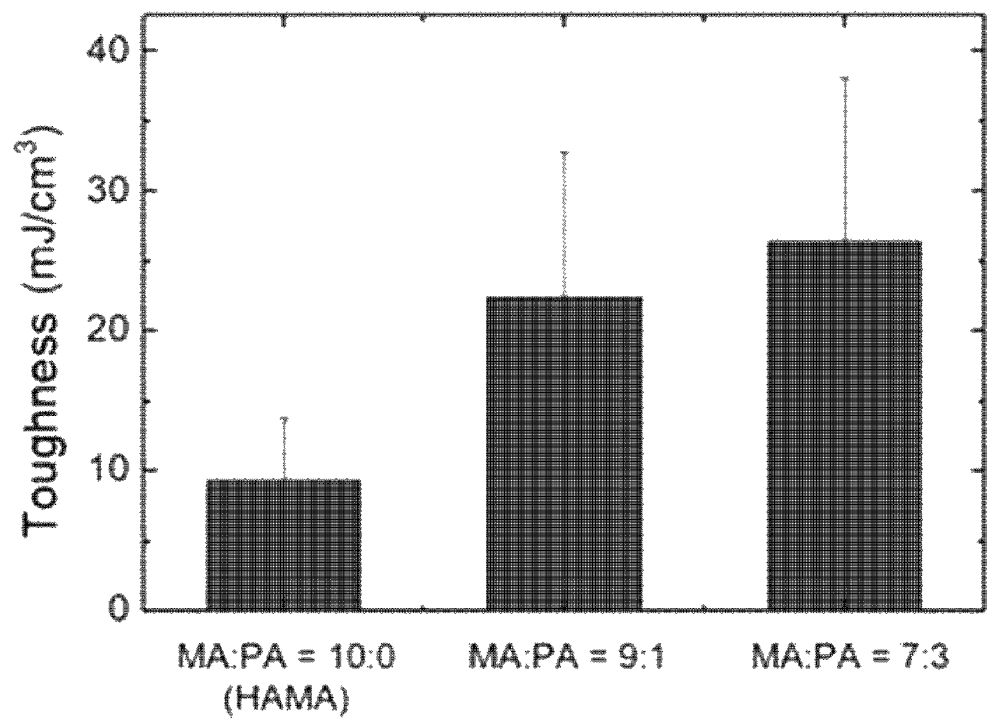
Figure 2D:
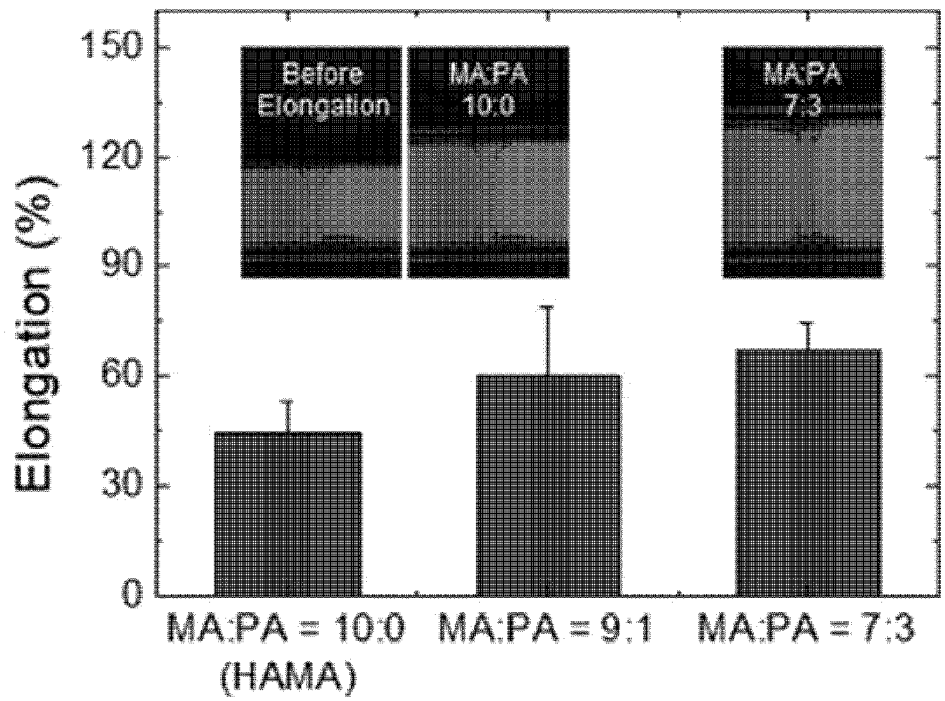

In addition, in the toughness test showing resistance to deformation, the HAMA-co-HAPA copolymer showed a result that was more than twice higher than that of the HAMA compound (FIG. 2c) and also showed a significantly improved result in the elongation that was higher than that of the conventional photo-crosslinkable single polymer (HAMA, MA:PA=10:0) (FIG. 2d).

Therefore, it was confirmed that by synthesizing the copolymer, rather than simply mixing HAMA and HAPA, the mechanical strength as well as the flexibility were improved.

<Example 2> Analysis of adhesive performance of HAMA-co-HAPA

In order to evaluate the adhesive performance of the HAMA-co-HAPA copolymer prepared in <Synthesis Example 1>, a Lap shear test of the copolymer HAMA-co-HAPA was performed, wherein the HAMA-co-HAPA was synthesized by varying the mixing ratio of methacrylic anhydride and 4-pentenoic anhydride to be added from 10:0 to 9:1.

After applying a HAMA-co-HAPA solution within artificial skin made of gelatin, UV was irradiated for 5 seconds, and the adhesion was evaluated by pulling both ends.

Figure 3:
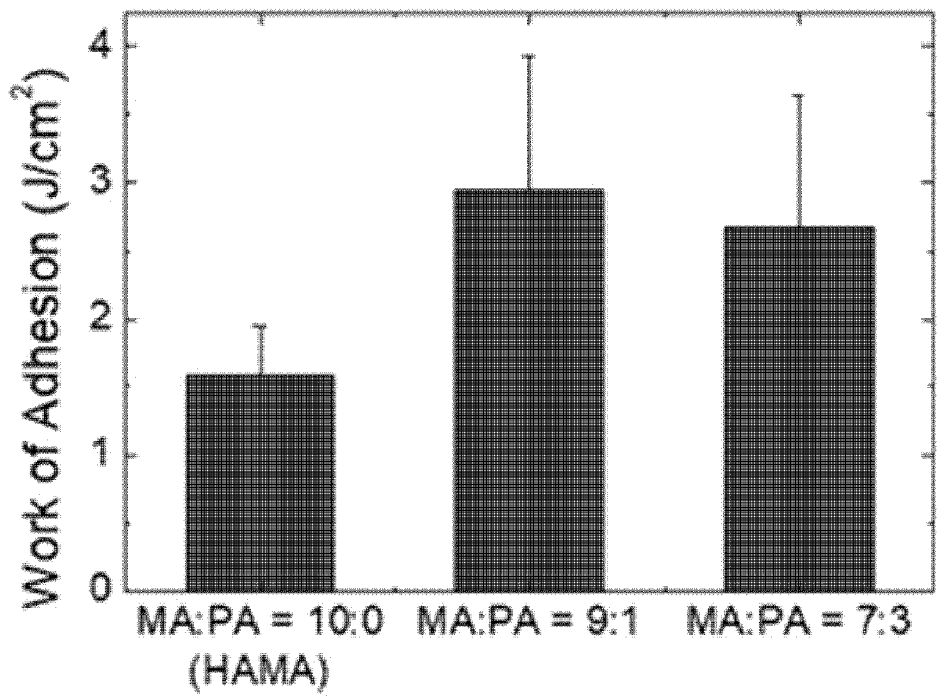
FIG. 3 shows results of an adhesion test for a HAMA-co-HAPA copolymer.

As a result, as shown in FIG. 3, the HAMA-co-HAPA copolymer showed higher adhesion than the HAMA single polymer, which is determined to be due to the improvement in mechanical properties.

As described above, a specific part of the present invention has been described in detail, for a person of an ordinary skill in the art, it is apparent that these specific descriptions are merely preferred embodiments, and the scope of the present invention is not limited thereby. Accordingly, the substantial scope of the present invention will be defined by the appended claims and equivalents thereof

What is claimed is:

1. A compound represented by Chemical Formula 1:

[Chemical Formula 1]

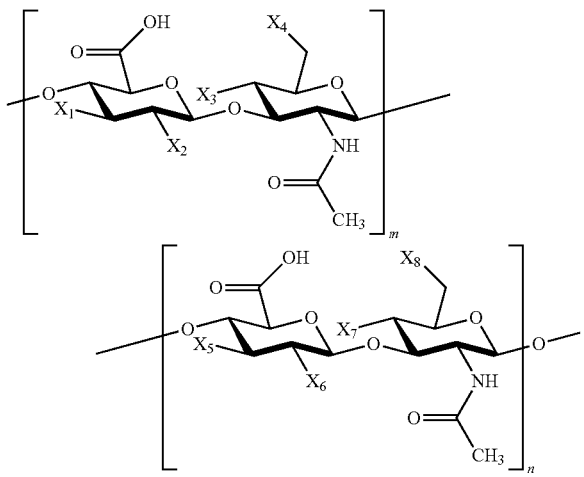

wherein, in Chemical Formula 1, m is an integer of 1 to 10,000 and n is an integer of 1 to 10,000, a ratio of m and n is 9:1 to 7:3, $X_1$, $X_2$, $X_3$, and $X_4$ are each independently a hydroxyl group or a substituent represented by Chemical Formula 1-1, provided that at least one of $X_1$-$X_4$ is the substituent represented by Chemical Formula 1-1, $X_5$, $X_6$, $X_7$, and $X_8$ are each independently a hydroxyl group or a substituent represented by Chemical Formula 1-2, provided that at least one of $X_5$-$X_8$ is the substituent represented by Chemical Formula 1-2,

[Chemical Formula 1-1]

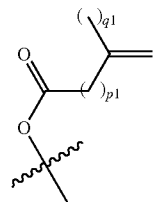

in Chemical Formula 1-1, $p_1$ is 1, and $q_1$ is 1,

[Chemical Formula 1-2]

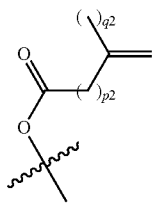

in Chemical Formula 1-2, $p_2$ is 2 to 10, and $q_2$ is 0.

2. The compound of claim 1, wherein the compound represented by Chemical Formula 1 is a compound represented by Chemical Formula 2:

[Chemical Formula 2]

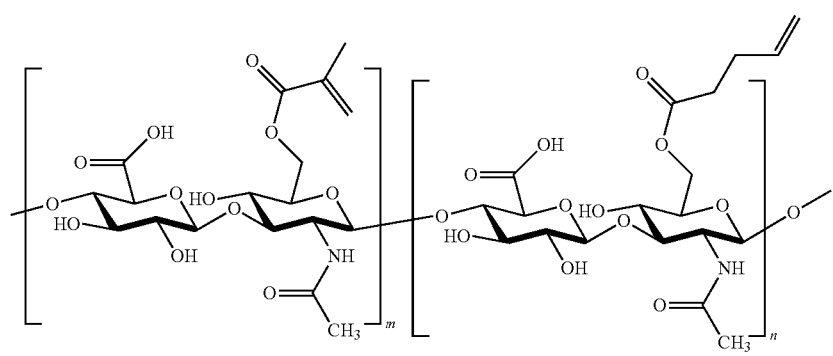

wherein, in Chemical Formula 2, m and n are each an integer of 1 to 10,000.

3. The compound of claim 1, wherein the compound represented by Chemical Formula 1 is a compound represented by Chemical Formula 3:

[Chemical Formula 3]

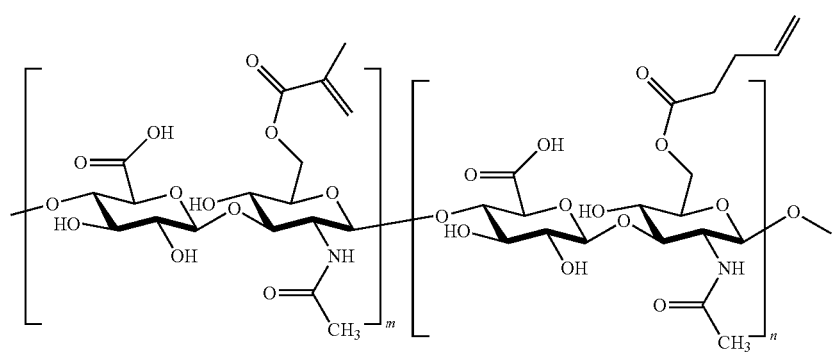

wherein, in Chemical Formula 3, m and n are each an integer of 1 to 10,000.

4. A hydrogel, wherein the compound of claim 1 is crosslinked via a photo-crosslinking reaction.

5. A biodegradable tissue adhesive, comprising the compound of claim 1.

6. The biodegradable tissue adhesive of claim 5, wherein the biodegradable tissue adhesive forms a hydrogel through a light-induced crosslinking reaction in response to exposed to light.

* * * * *